Nov. 24, 1942.   J. W. ARTZ   2,302,658
CRAWLER TRACTOR DRIVING MEANS
Filed Jan. 14, 1939   3 Sheets-Sheet 1

INVENTOR
Joseph W. Artz
BY
Synnestvedt & Lechner
ATTORNEYS

Nov. 24, 1942.  J. W. ARTZ  2,302,658
CRAWLER TRACTOR DRIVING MEANS
Filed Jan. 14, 1939  3 Sheets-Sheet 2

INVENTOR
Joseph W. Artz
BY
Synnestvedt & Lechner
ATTORNEYS

Nov. 24, 1942.　　　J. W. ARTZ　　　2,302,658
CRAWLER TRACTOR DRIVING MEANS
Filed Jan. 14, 1939　　　3 Sheets-Sheet 3
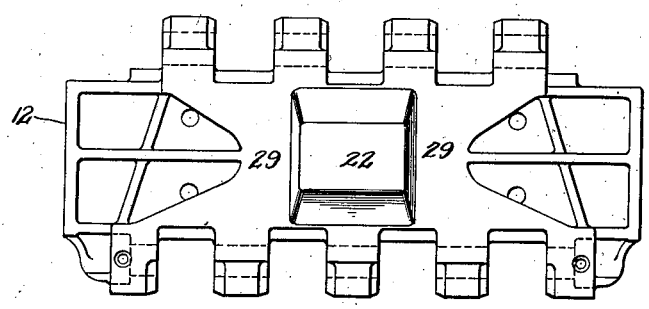
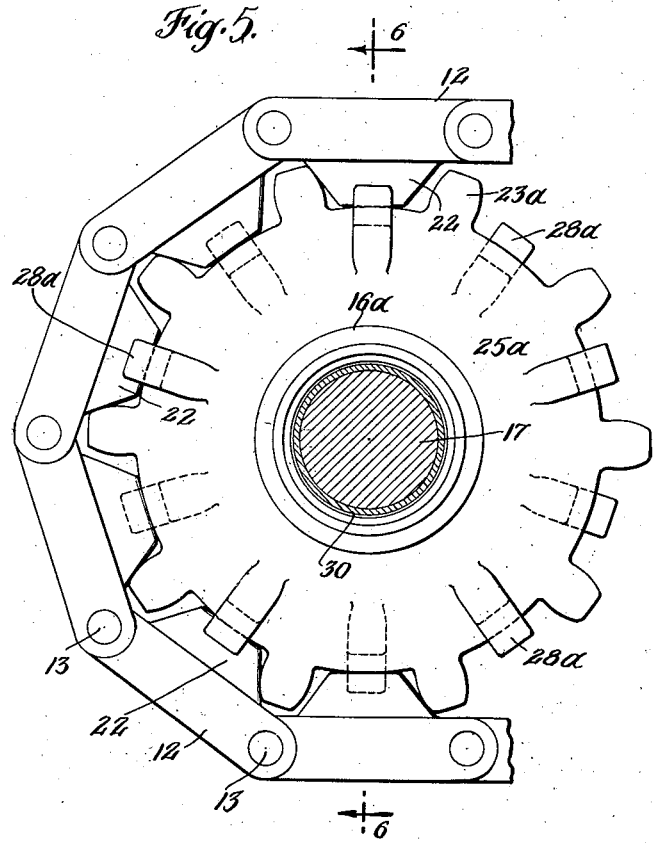
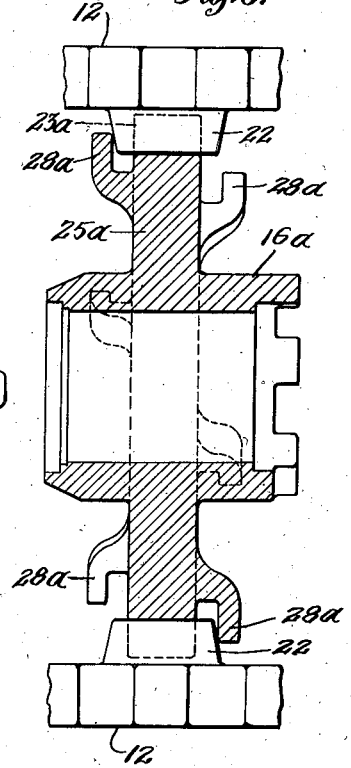

Patented Nov. 24, 1942

2,302,658

UNITED STATES PATENT OFFICE 2,302,658

CRAWLER TRACTOR DRIVING MEANS

Joseph W. Artz, Lima, Ohio

Application January 14, 1939, Serial No. 250,999

10 Claims. (Cl. 305—8)

This invention relates to tractors of the crawler tread type and is particularly concerned with the driving means for such a tractor.

In general, the invention contemplates cooperating sprocket and crawler tread structures having interengaging driving means and lateral retaining devices so arranged as to permit the ready lateral egress of material which would otherwise be trapped therebetween.

Still further, the invention has in view a cooperating crawler tread and driving sprocket having interengaging driving and lateral positioning means, spaced apart along the periphery of the sprocket, and adapted to transmit weight, traction, and lateral positioning forces, while at the same time preventing pocketing or accumulation of foreign material between the tread and sprocket.

More particularly, the invention contemplates: the provision of an improved driving means for crawler treads which presents no pockets or confined spaces in which mud, stones, sand, gravel or the like can accumulate, and which also prevents such accumulations from packing on the roller paths of the crawler belt; the provision of a driving means which overcomes the tendency for the crawler belts to become too tight, with the danger of breaking driver chains or breaking and bending rear axles; the provision of a driving sprocket in which mud, stones, snow, and the like cannot pack and freeze to a solid mass in cold weather; the provision of a driving sprocket having the improved characteristics before noted which can be readily substituted in the field for the driving sprockets heretofore in use with a minimum degree of trouble and expense.

More specifically, the invention involves peripherally spaced apart lateral retaining devices, adapted to serve as reenforcing means for the drive-transmitting means; the peripheral spacing apart of lateral retaining devices, either by locating them in transversely aligned pairs, or by arranging them in staggered relation; and the reduction of the weight of crawler tread driving sprockets without sacrifice of the necessary strength.

The foregoing objects, together with such other objects as are incident to my invention or which may appear hereinafter, are attained by means of a construction which is illustrated in preferred form in the accompanying drawings, wherein—

Figure 4 is a plan view of one of the crawler tread links;

Figure 5 is a side elevation of a somewhat modified form of driving means; and

Figure 6 is a section on the line 6—6 of Figure 5.

Figure 1:
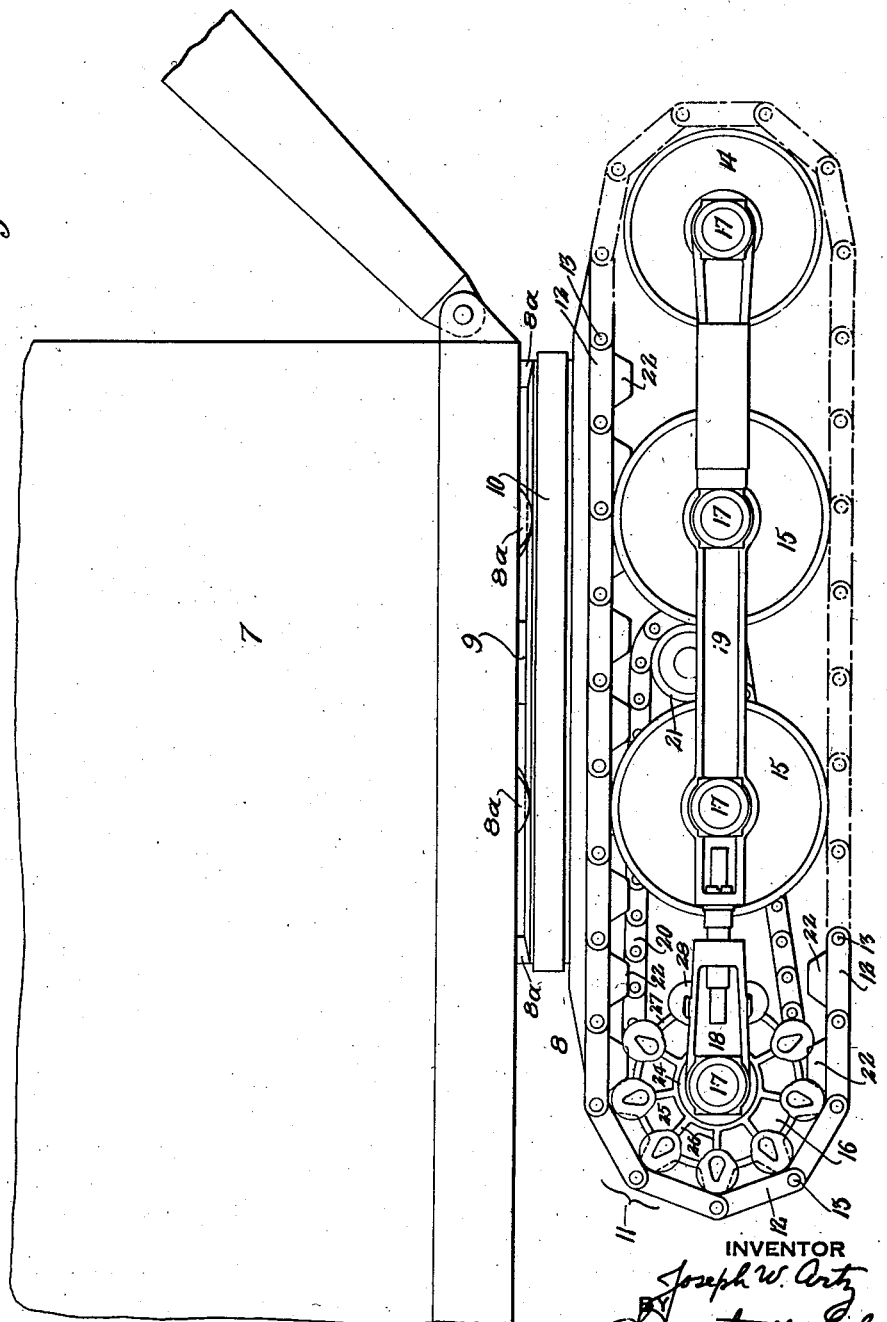
Figure 1 is a fragmentary side elevation (partly diagrammatic) of a tractor, such as a power shovel or crane, embodying my improvements.

Referring to the drawings, and particularly to Figure 1, it will be seen that the tractor body 7 is mounted upon the crawler truck 8 through the intermediation of the usual rollers 8a, circular track 10, and center pin 9.

Each side of the truck is provided in the usual manner with a crawler tread 11 composed of a plurality of individual link members 12 pivoted together by pins 13. The truck I have illustrated is provided with a front tread roller 14, a pair of center tread rollers 15 and the driver roller or sprocket 16. Each pair of rollers is provided with an axle 17 and at the sides there are the usual relatively adjustable side bar castings 18 and 19, one of the adjusting devices being shown as exposed to view, and the other being covered by the usual mudguard 18a. The tread driving wheel or sprocket 16 is driven as usual by a chain 20 and sprockets 21 (one of which appears in Figure 1).

Figure 2:
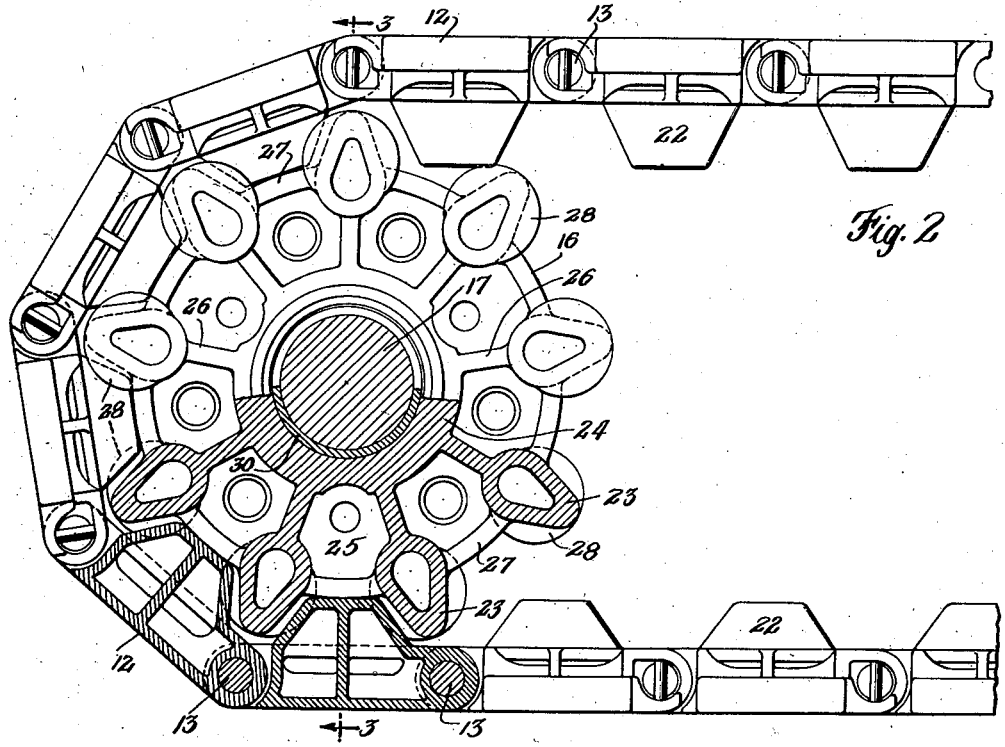
Figure 2 is a partial side elevation and vertical section on an enlarged scale of the improved driving means of my invention.

The improved crawler driving mechanism will now be described, reference being had particularly to Figures 2 to 4 inclusive. The crawler tread links are provided with the projecting driving lugs 22 which are engaged by the teeth 23 of the driving sprocket. In Figure 2, the teeth 23 are shown with clearance relative to the sloping drive-surfaces of the lugs 22, but it will be obvious that when the driving torque is applied the teeth bear against said lugs in a manner similar to that shown in Figure 5.

The driving sprocket has a hub portion 24 with centrally disposed web-like portions 25 radiating therefrom and lying between the base portions 26 of the teeth 23. In effect, therefore, the lug engaging portions of the teeth 23 are supported from the hub 24 by intersecting web members 25 and 26, which construction leaves an entirely open or free space, at each side face, between adjacent teeth. The web portions 25 are provided with a slightly widened periphery 27 the curved surface of which is adapted to rest upon the upper flat face of the driving lugs 22 on the crawler tread, thereby providing line to line weight-transmitting contact.

At each end of each tooth 23 is provided an individual tread retaining flange 28, which flanges are adapted to embrace the sides of the lugs 22, at intervals, to retain the tread as against lateral dislodgement. However, the flanges 28 do not project radially outwardly sufficiently far to touch the side roller paths 29 of the crawler tread.

The driving sprocket is mounted upon its axle 17 by means of a suitable bushing 30 and the sprocket is provided with clutch engaging teeth 31, but the details of the means for driving the sprocket itself are not illustrated herein because they form no part of the present invention.

Figure 3:
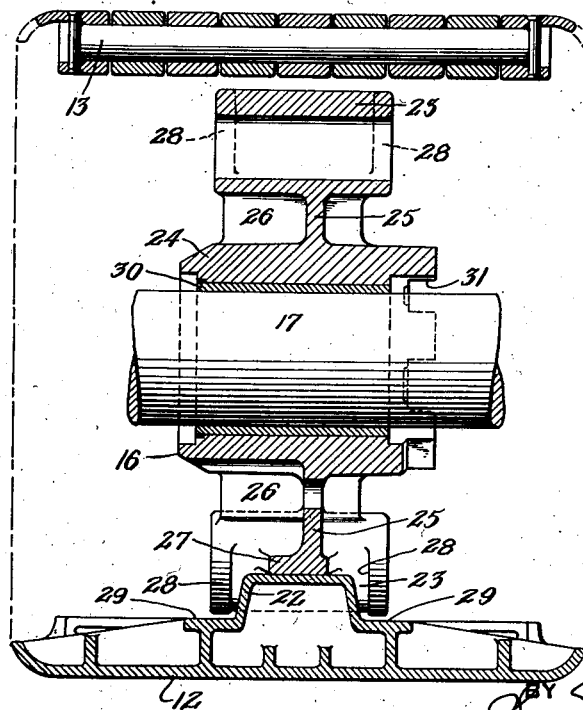
Figure 3 is a section on the line 3—3 of Figure 2.

In the form of Figures 2 and 3, as clearly appears at the bottom of Figure 3, the width of the teeth 23 is substantially equal to the width of the base of the lugs 22, or slightly larger, but the width of the web 25 is relatively very narrow, which construction in combination with the individual, spaced-apart retaining flanges 28 on the sides of the teeth provides the desired clear space at each side of the web between adjacent teeth, as already described.

In the modification shown in Figures 5 and 6 the driving sprocket 16a is of different construction than the sprocket of Figures 1 to 3. Here the hub is provided with a relatively narrow web portion 25a which, however, is wider than the web 25 of Figures 1 to 3. At the periphery of this web 25a are the driving teeth 23a and upon inspection of Figure 6 it will be seen that the teeth are of the same thickness as the web and that this thickness is somewhat less than the width of the crawler tread lugs 22. Between the teeth, the web 25a is provided at each side with a series of crawler tread retaining projections or flanges 28a which are adapted to engage the sides of the lugs 22 so as to retain the crawler tread in position laterally of the driving sprocket.

As to this form of the invention, it will also be observed that the lateral retaining flanges 28a are arranged in staggered relation, one such flange being placed at one side of the sprocket, and the next adjacent flange being placed at the other side of the sprocket. Furthermore, though the invention is not limited in this respect, there is only one projecting flange between each pair of teeth, with the result that each tread lug 22 is engaged by only one flange, at one side thereof, leaving the other side completely open for the free egress of any foreign material.

In both embodiments, the crawler tread retaining means is an interrupted means, i. e., one which is non-continuous around the periphery of the driving sprocket, the construction being such as to produce what may be termed a rimless driving sprocket in which there are no pockets such as have been employed in sprockets heretofore known to the art. There is a large, clear space at each side of the sprocket between adjacent teeth so that at no time is it possible for mud, sand, gravel, stones or dirt to accumulate on the engaging surfaces of the sprocket or tread. Such accumulations are particularly troublesome in cold weather with their liability to freeze into solid masses. Any accumulation tends to tighten the crawler treads to the point where breakage of drive chains or bending and breaking of rear axles takes place. These difficulties are all overcome by my improved construction.

My improved sprocket can be substituted in the field for sprockets heretofore in use without necessitating any change in the crawler tread itself, which is an important advantage from a practical and economical standpoint.

From the foregoing description of the construction itself, it will be evident, without further explanation, how the various objects and advantages of the invention are attained.

I claim:

1. In a tractor having a weight-receiving crawler tread structure and a weight-transmitting sprocket structure, the combination of driven means on the tread structure having a driven surface and a weight-receiving surface, said weight-receiving surface being configured to provide line to line contact with said sprocket structure, driving means on the sprocket structure adapted to engage the driven means on said tread structure, and peripherally spaced-apart lateral retaining devices on one of said structures in engagement with the other, said retaining devices being positioned to provide clearance for egress of material laterally to both sides of said structures, under the influence of the superimposed weight.

2. In a tractor, a crawler tread sprocket having a hub, a web, and teeth at the periphery of said web, and an endless crawler tread having lugs spaced apart longitudinally thereof, said lugs being engageable by said sprocket teeth and being configured to make line to line contact with the periphery of said web in passing around said sprocket, roller track portions at the sides of said lugs, and peripherally spaced flanges on said sprocket, said flanges being arranged in series spaced axially of the sprocket to straddle said lugs for laterally positioning the tread on the sprocket, said roller track portions being positioned to avoid contact with said teeth and said positioning flanges.

3. In a tractor having a weight-receiving crawler tread structure and a weight-transmitting sprocket structure, the combination of driven means on the tread structure having a driven surface and a weight-receiving surface, said weight-receiving surface being configured to provide line to line contact with said sprocket structure, driving means on the sprocket structure adapted to engage the driven means on said tread structure, and peripherally spaced-apart lateral retaining devices on one of said structures in engagement with the other, said retaining devices being positioned to provide clearance for egress of material laterally to both sides of said structures, under the influence of the superimposed weight, and said retaining devices being formed as reinforcements for the driving means on the sprocket.

4. For a tractor having a crawler tread with spaced lugs thereon, a sprocket comprising driving teeth carried thereby for engaging said lugs, and flanges on the sprocket spaced axially of the sprocket sufficiently to straddle the lugs on the tread to effect relative lateral positioning of the sprocket and tread, the said flanges at each side of the sprocket being spaced from each other peripherally of the sprocket to provide lateral openings between the teeth for egress of foreign material, the sprocket being provided with a weight-transmitting surface between adjacent teeth adapted to contact with the top surface of the tread lugs, the weight-transmitting surface being located intermediate the flanges and being of width appreciably less than the spacing between said flanges, whereby space for egress of foreign material is provided laterally at each side of the sprocket between the peripherally spaced flanges at that side.

5. A construction in accordance with claim 4 in which a lateral positioning flange is located at each end of each driving tooth.

6. A construtcion in accordance with claim 4 in which the lateral positioning flanges at opposite sides of the sprocket are arranged in staggered relation.

7. A construction in accordance with claim 4 in which the weight-transmitting surface of the sprocket has line-to-line weight-transmitting contact with tread lugs in the region of the spaces provided for egress of foreign material.

8. A tractor sprocket adapted to cooperate with a crawler tread, said sprocket having a hub, webbing projecting from the hub in a plane perpendicular to the hub axis, a plurality of spaced webs radiating from the hub in planes perpendicular to said first plane, a driving tooth at the outer edge of each web, the teeth being connected with said webs and webbing and projecting radially therefrom, the webbing having peripheral weight-transmitting surfaces between the teeth of width considerably less than the lateral dimension of said teeth, and flanges disposed at both sides of the sprocket, each at an end of sprocket tooth, and adapted to engage the crawler tread to effect relative lateral positioning of the sprocket and tread, the flanges at each side of the sprocket being circumferentially spaced from each other, and the spaces between said teeth being laterally open and also radially open at opposite sides of said webbing for free communication with the spaces between said webs, and said latter spaces at opposite sides of said webbing further being laterally open, whereby to provide for relatively free egress of foreign material from the weight-transmitting, driving and lateral positioning surfaces.

9. A construction in accordance with claim 8 in which a lateral positioning flange is located at each end of each driving tooth.

10. A crawler sprocket, adapted to cooperate with a crawler tread which has spaced lugs thereon and roller track surfaces disposed laterally of said lugs, said sprocket comprising driving teeth for successively engaging said lugs, and flanges on the sprocket spaced axially of the sprocket sufficiently to straddle the lugs on the tread to effect relative lateral positioning of the sprocket and tread, the said flanges at each side of the sprocket being spaced from each other peripherally of the sprocket to provide lateral openings between the teeth for egress of foreign material, the sprocket being provided with a weight-transmitting surface between adjacent teeth adapted to contact with the top surface of the tread lugs, the weight-transmitting surface being located intermediate the flanges and being of width appreciably less than the spacing between said flanges, whereby space for egress of foreign material is provided laterally at each side of the sprocket between the peripherally spaced flanges at that side, and the said flanges projecting radialy a distance less than the height of the crawler tread lugs so as to leave a clearance between said flanges and the roller track surfaces.

JOSEPH W. ARTZ.

CERTIFICATE OF CORRECTION.

Patent No. 2,302,658. November 24, 1942.

JOSEPH W. ARTZ.

It is hereby certified that error appears in the above numbered patent requiring correction as follows: In the drawings, Sheets 1 and 3, strike out Figures 1 and 6 respectively, and insert instead the following -

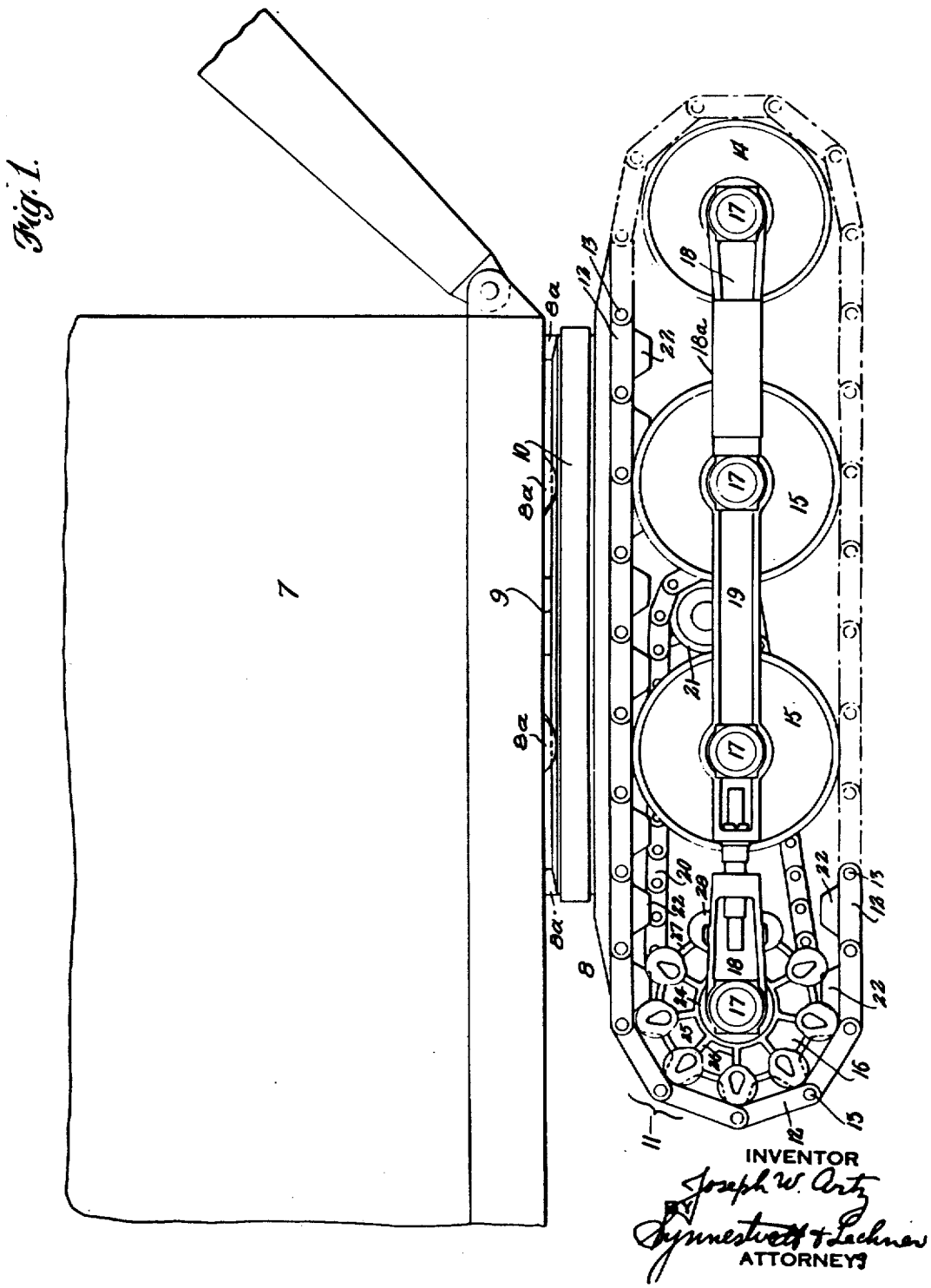

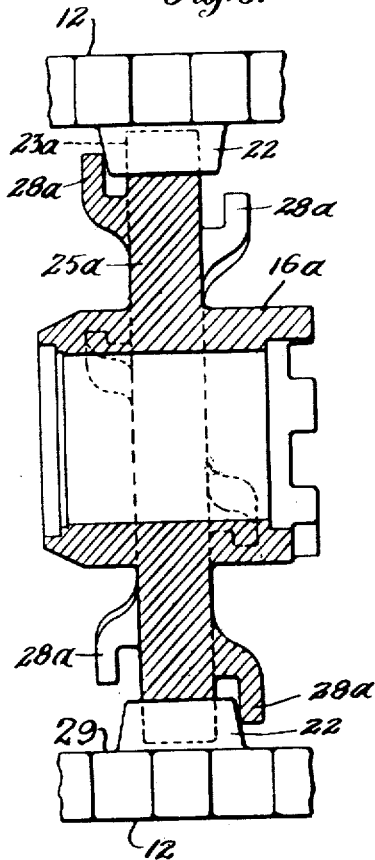

Fig. 6.

and in the printed specification, page 3, first column, line 6, claim 6, for "construtcion" read --construction--; line 28, claim 8, before "sprocket" insert --a--; and second column, line 30-31, claim 10, for "radialy" read --radially--; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.